US012739590B2

(12) United States Patent
Oellers et al.

(10) Patent No.: US 12,739,590 B2
(45) Date of Patent: Sep. 15, 2026

(54) VIRTUAL LOUDSPEAKERS FOR ACOUSTICALLY OPAQUE SCREENS

(71) Applicant: HOLOPLOT GmbH, Berlin (DE)

(72) Inventors: Helmut Oellers, Erfurt (DE); Michael Hlatky, Berlin (DE)

(73) Assignee: HOLOPLOT GMBH, Berlin (DE)

( * ) Notice: Subject to any disclaimer, the term of this patent is extended or adjusted under 35 U.S.C. 154(b) by 582 days.

(21) Appl. No.: 17/919,813

(22) PCT Filed: Apr. 20, 2021

(86) PCT No.: PCT/EP2021/060241
§ 371 (c)(1),
(2) Date: May 22, 2024

(87) PCT Pub. No.: WO2021/214058
PCT Pub. Date: Oct. 28, 2021

(65) Prior Publication Data

US 2024/0340607 A1 Oct. 10, 2024

(30) Foreign Application Priority Data

Apr. 20, 2020 (DE) ..................... 10 2020 110 713.7

(51) Int. Cl.
*H04R 3/12* (2006.01)
*H04R 5/02* (2006.01)
(Continued)

(52) U.S. Cl.
CPC ............... *H04S 7/305* (2013.01); *H04R 3/12* (2013.01); *H04R 5/02* (2013.01); *H04S 3/008* (2013.01);
(Continued)

(58) Field of Classification Search
None
See application file for complete search history.

(56) References Cited

U.S. PATENT DOCUMENTS 9,716,961 B2 * 7/2017 Oellers ..................... H04S 3/02
2005/0025318 A1 2/2005 Sadaie et al.
(Continued)

FOREIGN PATENT DOCUMENTS

DE 102005001395 A1 8/2005
EP 3061271 B1 4/2018
(Continued)

OTHER PUBLICATIONS

Berkhout, A.J., "A holographic approach to acoustic control." Journal of the Audio Engineering Society, 1988, pp. 977-995, vol. 36, No. 12.

(Continued)

*Primary Examiner* — Quynh H Nguyen
(74) *Attorney, Agent, or Firm* — Sterne, Kessler, Goldstein & Fox P.L.L.C.

(57) ABSTRACT

An acoustic transducer arrangement for an acoustically opaque wall display includes a number of acoustic transducers for emitting at least one acoustic wavefront that is curved such that, after reflection on a wall display, the least one acoustic wavefront emanates virtually from a region that is associated with an acoustic source optically represented in the corresponding region of the wall display into a viewer area.

20 Claims, 8 Drawing Sheets

(51) Int. Cl.
*H04S 3/00* (2006.01)
*H04S 7/00* (2006.01)

(52) U.S. Cl.
CPC ........ *H04S 7/302* (2013.01); *H04R 2201/401* (2013.01); *H04R 2499/15* (2013.01); *H04S 2400/01* (2013.01); *H04S 2400/11* (2013.01); *H04S 2420/13* (2013.01)

(56) References Cited

U.S. PATENT DOCUMENTS

| | | | | |
|---|---|---|---|---|
| 2016/0192103 | A1 | 6/2016 | Oellers et al. | |
| 2019/0045320 | A1 | 2/2019 | Peace, Jr. | |
| 2022/0146702 | A1* | 5/2022 | Lemarenko | G01V 1/52 |

FOREIGN PATENT DOCUMENTS

| | | | | |
|---|---|---|---|---|
| EP | 3439330 | A1 | 10/2020 | |
| JP | 12250600 | A | 10/1990 | |
| JP | H02250600 | A | 10/1990 | |
| JP | 200456261 | A | 2/2004 | |
| JP | 2004056261 | A | 2/2004 | |
| WO | WO-2015004526 | A2 * | 1/2015 | H04R 1/403 |
| WO | 2020227633 | A1 | 11/2020 | |
| WO | 2020249675 | A1 | 12/2020 | |

OTHER PUBLICATIONS

Blauert, J., Räumliches Hören. S. Hirzel Verlag Stuttgart, 1974, pp. 1-471 (English-Language Machine Translation of Preface).

Bubeck, S., “Der größte Fernseher der Welt”, 2018, https://www.giga.de/events/wm-2018/news/dergroesste-fernseher-der-welt (English-Language Machine Translation).

Invidis, “Samsung the Wall: Premium LED für fast jeden Use-Case”, 2020, https://invidis.de/2020/11/samsung-the-wallpremium-led-fuer-fast-jeden-use-case/ (English-Language Machine Translation).

Start, E.W. “Direct sound enhancement by wave field synthesis” Delft Univ. of Technology, 1997, pp. 1-232.

International Search Report and Written Opinion of the International Searching Authority directed to related International Patent Application No. PCT/EP2021/060241, mailed Jun. 15, 2021; 14 pages.

Translation of the International Search Report and Written Opinion of the International Searching Authority directed to related International Patent Application No. PCT/EP2021/060241, mailed Jun. 15, 2021; 9 pages.

International Preliminary Report on Patentability directed to related International Patent Application No. PCT/EP2021/060241, mailed Oct. 25, 2022; 11 pages.

Translation of the International Preliminary Report on Patentability directed to related International Patent Application No. PCT/EP2021/060241, mailed Oct. 25, 2022; 8 pages.

* cited by examiner

VIRTUAL LOUDSPEAKERS FOR ACOUSTICALLY OPAQUE SCREENS

CROSS REFERENCE TO RELATED APPLICATIONS

This application is the United States national phase of International Patent Application No. PCT/EP2021/060241 filed Apr. 20, 2021, and claims priority to German Patent Application No. 10 2020 110 713.7 filed Apr. 20, 2020, the disclosures of which are hereby incorporated by reference in their entireties.

BACKGROUND

1) Technical Field

The present disclosure related to an acoustic transducer arrangement according to the principle of wave field synthesis, with which a reflected wavefront allows substantially stable localization of the center channel.

2) Technical Description

With the development of display technology, it has become advantageous to configure even large display screen diagonals, such as may be found in the movie theater sector and increasingly in home cinema, as a self-illuminating display with high resolution. Micro-LED display screens in this case offer an extremely high contrast range and, because of their modular construction, are in principle no longer limited in their size. The small pixel spacing, however, does not make it possible to make the wall display acoustically transparent. For this reason, acoustic transducers can no longer be arranged behind the display.

For authentic reproduction, however, especially with large display screens, it is important for the acoustic source to be localized at least approximately in the direction of the associated object. With conventional stereo loudspeakers on the left and right of the wall display, the reproduction no longer meets the current requirements for the acoustic association of the acoustic event. The localization of the phantom acoustic source is too dependent on the respective seat position of the viewer in the reproduction area. Even with more recent reflection methods, the localization of the acoustic source is still highly dependent on the position of the viewer in the audience area.

SUMMARY

Disclosed is an acoustic transducer arrangement for an acoustically opaque wall display including a multiplicity of acoustic transducers for emitting at least one acoustic wavefront that is curved such that, after reflection on a wall display, the least one acoustic wavefront emanates virtually from a region that is associated with an acoustic source optically represented in the corresponding region of the wall display into a viewer area.

DETAILED DESCRIPTION

The quality of the reproduction of motion pictures has rapidly improved in recent years. Nowadays, Ultra HD with a resolution of 4096×2160 pixels has become standard even in the home sector, and 8K devices with 7680*4320 pixels are available on the market. This is comparable to the resolution of 70 mm films which were still playing in large movie theaters two decades ago.

This rapid development is now stimulating the desire to represent the high resolution even on correspondingly large display screens which involve the viewer in the action with a wide angle of view. Nowadays, the size of high-resolution display screens is in principle no longer limited either. Micro-LED display screens can be constructed modularly and combined to give any desired size. Extremely high contrast range together with optimal resolution will contribute to the rapid spread of the technology in home cinema, but also in the movie theater sector. Without a projection room, for the same number of seats, future movie auditoria could be smaller or even contain windows (see for example https://invidis.de/2020/11/samsung-the-wall-premium-led-fuer-fast-jeden-use-case/).

Unfortunately, such display screens are no longer acoustically transparent, in the way that perforated projection screens were. The acoustic transducers can therefore no longer be positioned behind the wall display. This entails the problem that the acoustic localization of the acoustic source no longer coincides with its optically perceived image position. The representation of a phantom acoustic source between right and left loudspeakers no longer corresponds to the current requirements for authentic audio reproduction. The localization of the phantom acoustic source is highly dependent on the respective seat position of the viewer.

A center loudspeaker could only be mounted below or above the display screen. In this way, however, the mislocalization in the elevation plane would no longer be bearable. Not even the simultaneous reproduction from two loudspeakers, which would be fitted above and below the display screen, could solve the problem. In the elevation plane, no interaural time differences (ITDs) are created between our ears, for which reason a phantom acoustic source is not formed in this case. Both signals would be added up at each ear, which, because of interferences connected with their different path lengths to the respective listener seat, would lead to pronounced comb filter effects in the frequency response.

Figure 1:
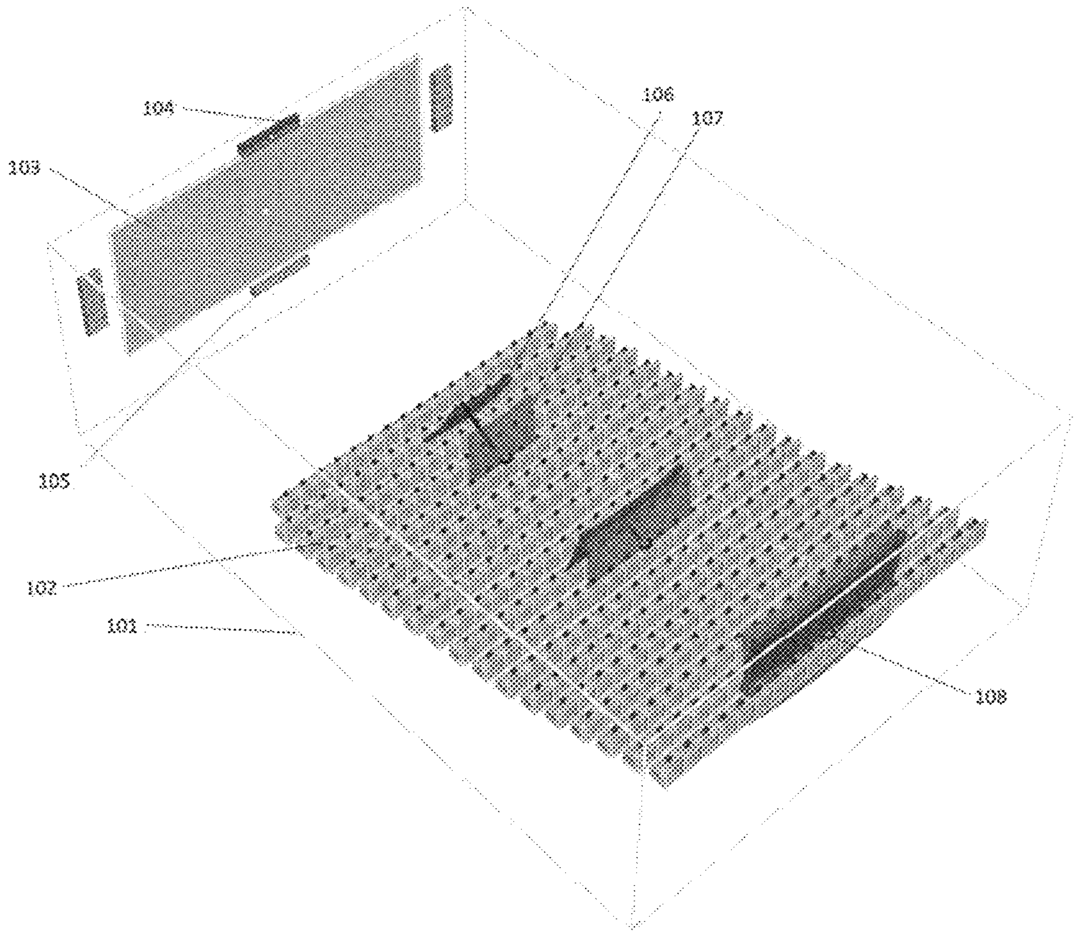
FIG. 1 (PRIOR ART)
FIG. 1 is a schematic perspective view of an acoustic transducer arrangement for a sound-reflecting wall display according to the prior art.

This is illustrated in FIG. 1 which shows schematically a reproduction room 101, a view area 102, a sound-reflecting wall display 103, an upper center loudspeaker 104, a lower center loudspeaker 105, a wavefront 106 of the upper center loudspeaker 104, a wavefront 107 of the lower center loudspeaker 105, and a listener 108 at whom the wavefronts arrive simultaneously. The superposition of the two signals 106, 107 leads to deep notches in the frequency response because the amplitudes of the two signals are approximately equal. However, the path lengths differ significantly from one row of seats to another. Even when compensating for the time offset for an individual seat, distortions occur in the frequency response in the medium and upper audio frequency range at all other positions.

It is precisely in this range that the linearity of the frequency response is very important for the localization of the acoustic source. We localize by means of the frequency response of the signal particularly in the elevation plane since, due to the lack of time-of-flight differences between the ears, our direction perception is in this case dependent on learned stimulus patterns. The localization relies above all on reflections at the outer ear and at the shoulders that are restricted to the medium and upper audio frequency range. This amplitude-based direction perception is far less accurate than the time-of-flight locating in the azimuthal plane. According to studies by Blauert (Jens Blauert: Räumliches Hören [Spatial hearing]. S. Hirzel Verlag, Stuttgart 1974), we can perceive a deviation of +−10 degrees for a source elevation angle of 30 degrees. Beyond this, we no longer attribute the acoustic event to the optical source. The value is individually very different and is substantially dependent on the nature of the signal content. These “Blauert” bands are used in Head Related Transfer Function (HRTF) methods for the controlled manipulation of perception in the elevation plane. Seat position-dependent variations in the frequency response are therefore extremely counterproductive for localization in the elevation plane.

In the exemplary diagram according to FIG. 1, there is a vertical aperture angle of about 25 degrees in the middle of the viewer area. The mislocalization in the elevation plane would thus be tolerable if the acoustic source were positioned approximately half-way up the wall display. Because the starting point of human voices, which we can localize particularly well because of our hearing experience, usually lies above the middle of the image, a source position on a single line approximately at 2/3 of the image height would be sufficient to ensure subjectively satisfactory reproduction in the elevation plane.

Unfortunately, the acoustically opaque display screen defeats all attempts at this height to emit the sound with conventional loudspeakers from this region. Here, there is only the possibility of using the closed surface of the display screen also as a reflection surface for the acoustic waves. A possibility of directing acoustic waves purposely onto reflection surfaces in order to localize the mirror acoustic source as their starting point has already been described in DE 10 2005 001395 A1. A concept for the reflection of acoustic waves at an acoustically hard wall display has now also been made known.

Thus, the technology described in WO 2020/227633 A1 uses the display screen as a reflector for acoustic waves directed onto it. Loudspeakers mounted above the viewer area are aligned at the display screen. They reproduce only the frequency range above 350 Hz, which is important for the localization of the acoustic source, and are supplemented with a time-aligned low-frequency loudspeaker.

Compared to real loudspeakers behind the wall display, this solution has the disadvantage that the position of the mirror acoustic source of the loudspeaker, which is localized by the viewers as an acoustic source, is positioned relatively far behind the display screen at the distance of the relevant loudspeaker from the wall display. This causes a parallax shift dependent on the seat position, for which reason the localization of the center loudspeaker is accurate only in the middle of the row of seats.

Figure 2:
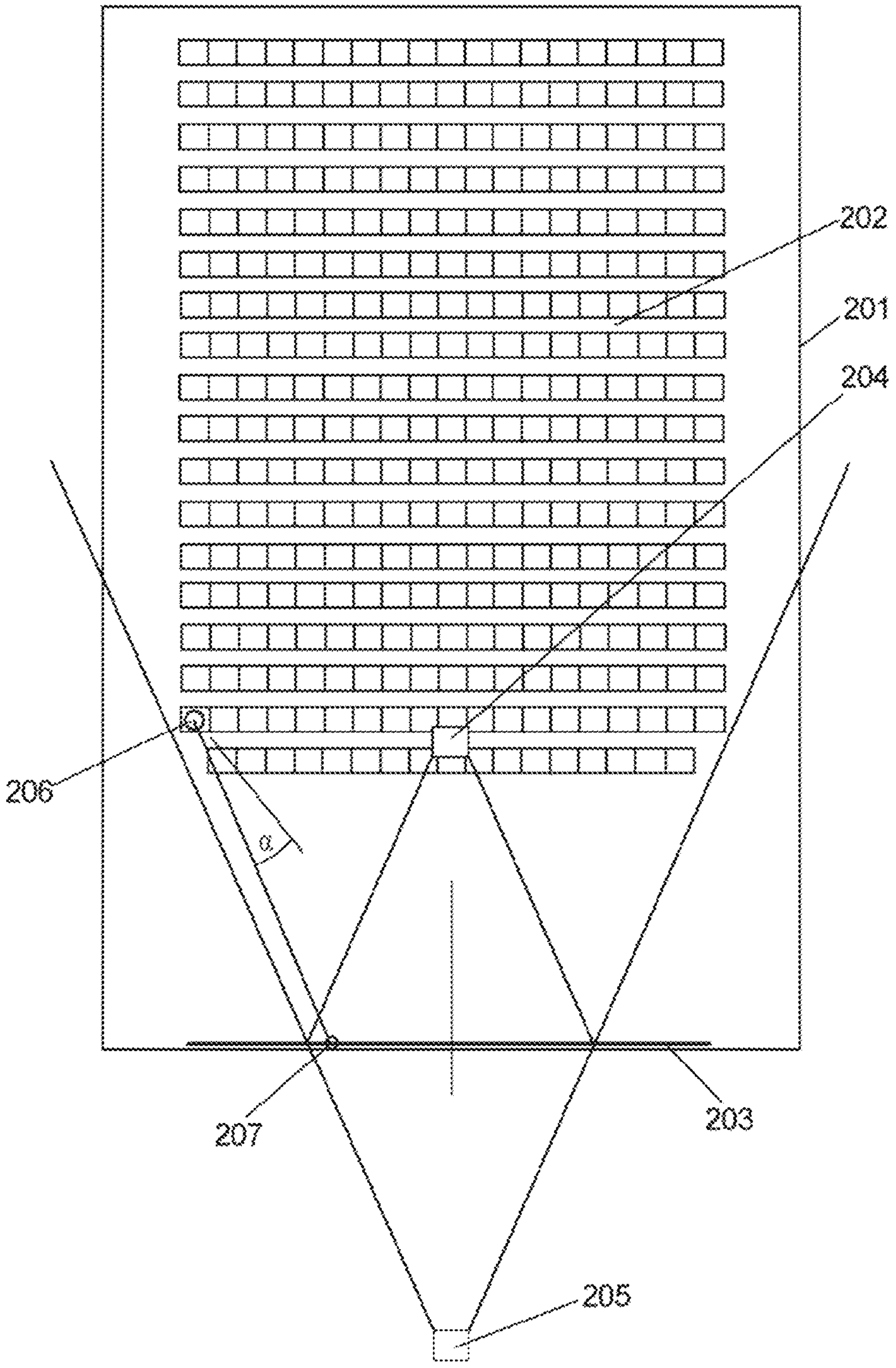
FIG. 2 (PRIOR ART)
FIGS. 2 and 3 are schematic plan views of acoustic transducer arrangements for sound-reflecting wall displays according to the prior art.

This problem is illustrated in FIG. 2 which shows schematically a reproduction room 201 that includes a viewer area 202, a sound-reflecting wall display 203, a center loudspeaker 204 on the ceiling of the reproduction room 201, mirror acoustic source 205 of the center loudspeaker 204, a front right viewer 206, and a center source position 207 for the front right viewer 206. The center loudspeaker 204 is mounted centrally in the width extent of the reproduction room (e.g., a movie auditorium) 201 over the front viewer seats. It irradiates toward an acoustically hard wall display 203 (display screen) with a restricted aperture angle, so that all viewers on their seats localize a mirror acoustic source 205 as the starting point of the reflected wavefront. For the viewers in the middle of the viewer area 202, the acoustic perception coincides with the optical perception when the associated acoustic source is visually represented approximately in the middle of the wall display 203.

However, the further the seat position departs from the midline (i.e. the further away the seat positions lie from the edge of the rows of seats), the greater the direction error alpha becomes. A viewer at a position of the front right viewer 206 on the far right of the viewer area 202 hears the mirror acoustic source in the right image region, while conversely a viewer at the front left of the viewer area 202 localizes the same mirror acoustic source in the left image region. The direction perception in the azimuthal plane, relying on interaural time differences, can already detect direction errors of about one degree. The error becomes no longer tolerable for the front right viewer 206 on the far right in particular when a visual starting point is represented to the left of the middle. With the described solution, the problem can remain within acceptable limits only if the width of the audience area, particularly in the front rows of seats, is significantly restricted.

In this example, the auditively perceived source position already deviates by 15 degrees from an object represented in the middle of the image. In order to reduce the error to 10 degrees, the outer four seats would need to be removed on each side of this row of seats. Such a solution would sometimes be achievable in small home cinemas, but it would make public movie theaters uneconomical.

Figure 3:
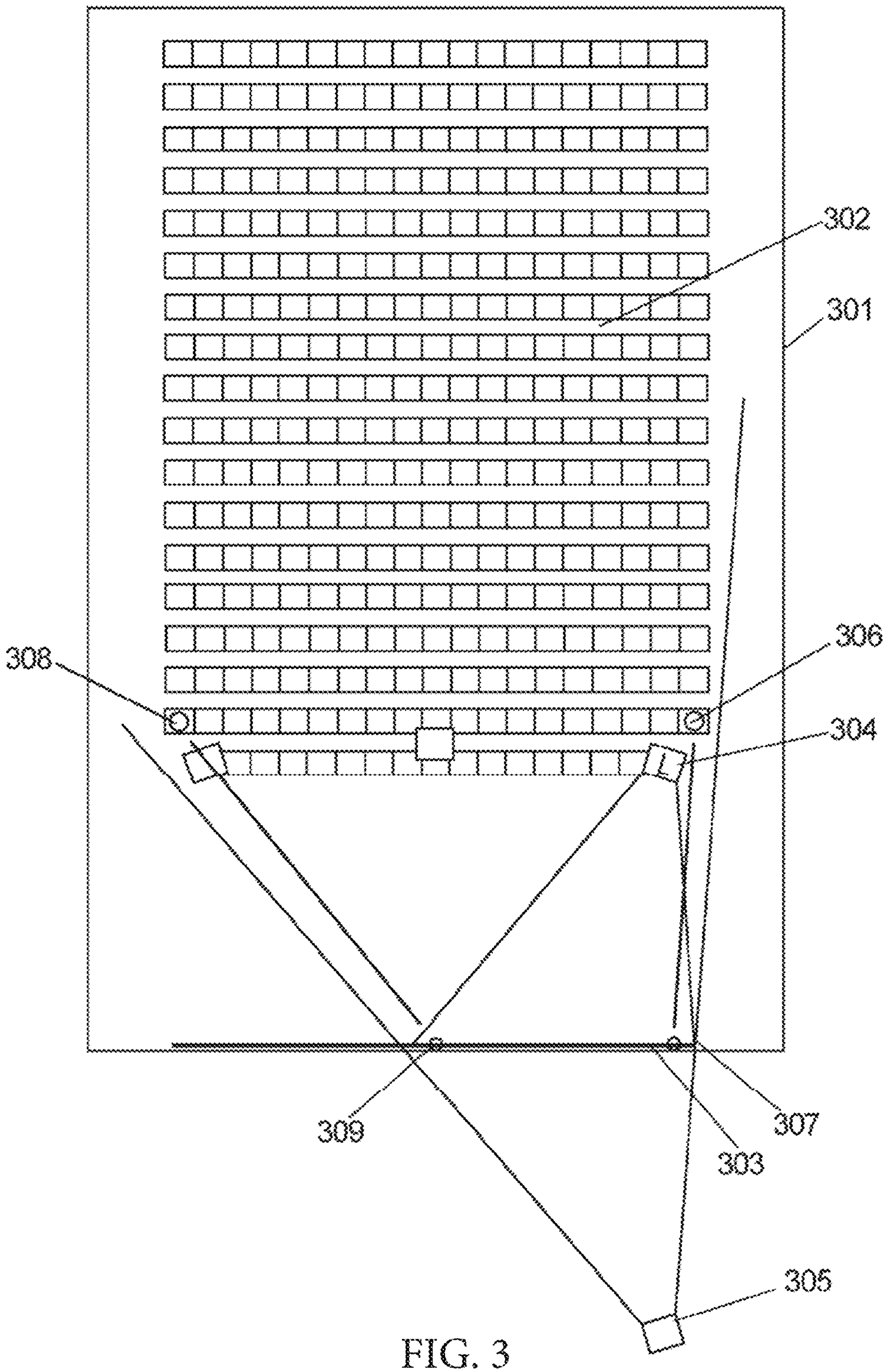
FIG. 3 (PRIOR ART)

FIG. 3 shows schematically a reproduction room 301 that includes a viewer area 302, a sound-reflecting wall display 303, a left loudspeaker 304 on the ceiling of the reproduction room 301, a mirror acoustic source 305 of the left loudspeaker 304, a front left viewer 306, an azimuthal localization 307 of the left channel for the front left viewer 306, a front right viewer 308, and azimuthal localization 309 of the left channel for the front right viewer 308. In FIG. 3, the left channel operates by means of reflection at the wall display 303 of sound output by the left loudspeaker 304. Here, the parallax problems become even more significant. The viewer 306 on the left side localizes the reflection from the correct direction (azimuthal localization) 307. For all other viewers, however, the localization of the left channel moves further and further in the direction of the middle of the wall display 303, and the right front viewer 308 perceives it almost in the middle of the wall display at the position (azimuthal localization) 309 in this example.

The same applies for a viewer 308 on the right side when they localize the reflection of the right loudspeaker (not numbered). For laterally sitting viewers, besides the described mislocalizations, the spatial perception is also greatly restricted because the stereo baseline is reduced from the full image width to in some cases half the image width.

The described effects could be reduced if the loudspeakers are mounted closer to the wall display. This, however, is scarcely possible in practice because the perceived mirror acoustic source then moves further and further toward the upper image edge. The back rows will in that case no longer be reached by the reflected wave because it is directed downward too much.

It would, therefore, be desirable to generate virtual acoustic sources which are positioned close to the wall display in the azimuthal plane but whose wavefront reaches all viewer seats in the elevation plane. The described parallax problems may therefore be reduced significantly.

Non-limiting embodiments or examples in accordance with the principles of the present disclosure are described below with reference to FIGS. 4-8 which are based on the Huygens' principle, as is also used in wave field synthesis for audio reproduction (Berkhout, A. J. (1988: *A holographic approach to acoustic control*. Journal of the Audio Engineering Society, Vol. 36, No. 12, December 1988, p. 977-995). In this case, the method can only limitedly be reduced to a single row of loudspeakers, as is conventional in many applications. A two-dimensional WFS (wave field synthesis) emitter surface is employed, such as is known for example from DE 102005001395 B4. This can also generate concave wavefronts that are focused at a point or a narrowly limited region.

In principle, acoustic transducer arrangements 404, 504, 604, 704, 804 (also referred to as a loudspeaker system) that are used in conjunction with acoustically opaque display screens (also referred to as a wall display 403, 503, 603, 703, 803) are described herein with reference to FIGS. 4-8. The use of the acoustic transducer arrangement 404, 504, 604, 605, 704, 804 with the wall displays 403, 503, 603, 703, 803 means that they are both mutually aligned in a fixed way. The acoustic transducer arrangements 404, 504, 604, 605, 704, 804 and the wall displays 403, 503, 603, 703, 803 therefore together form a sound system for a viewer area 402, 502, 602, 702, 802.

In this case, with a multiplicity of acoustic transducers in the acoustic transducer arrangement 404, 504, 604, 605, 704 and acoustic guides in the loudspeakers 804, acoustic wavefronts 406, 506, 607, 707, 806 are curved in such a way that after their reflection on an acoustically opaque display screen, i.e. the wall display 403, 503, 603, 703, 803, the reflections seem, to a viewer or listener seated in a seat in the viewer area, to emanate from a region that can be associated with an acoustic source optically represented in the central region 405, 505, 805 of the same image reproduction device (i.e. the wall display 403, 505, 603, 805).

In a further embodiment, a curvature of the wavefront 406, 506, 607, 707 can be generated by means of retarding elementary waves of the acoustic transducers of a two-dimensional acoustic transducer arrangement 404, 504, 604, 605, 704 according to the principle of wave field synthesis. The acoustic signal to be emitted by the acoustic transducer arrangement 404, 504, 604, 605, 704 is in this case emitted by the acoustic transducers respectively with an individual time offset so that the curved wavefront 406, 506, 607, 707 is formed. The acoustic transducers are in this case substantially arranged in a surface, which may for example be a plane or else a surface having planar and curved sections.

In a further embodiment, the levels of the individual acoustic transducers in a two-dimensional acoustic transducer arrangement 404, 504, 604, 605, 704 are selected according to the principle of wave field synthesis in such a way that a higher acoustic pressure level is created in the direction in which the wavefront 406, 506, 607, 707 reaches the viewers further away from the sound-reflecting wall display 403, 503, 603, 703, 803 than in the direction of the front viewer seats, whereby a balanced level distribution throughout the viewer area 402, 502, 602, 702 is ensured after its reflection at the acoustically opaque display screen. The acoustic transducer arrangement 404, 504, 604, 605, 704 is therefore driven in such a way that, in conjunction with the wall display 403, 503, 603, 703, a deliberate gradient of the acoustic pressure level as a function of the distance from the wall display 403, 503, 603, 703 is created, i.e. the acoustic pressure level remains relatively constant with the distance from the wall display 403, 503, 603, 703.

Figure 4:
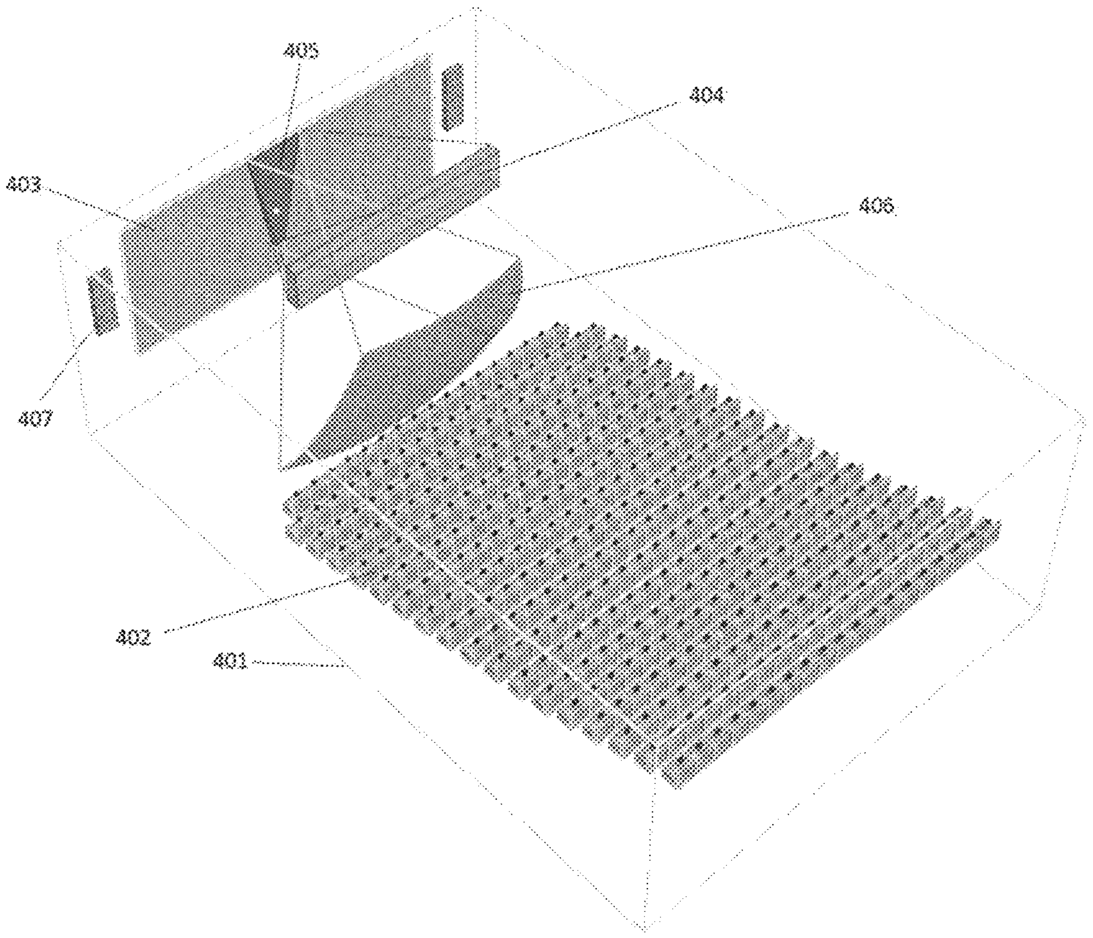
FIGS. 4-8 are schematic perspective views of acoustic transducer arrangements for sound-reflecting wall displays in accordance with the principles of the present disclosure.

In the model-based approach of wave field synthesis, the application of which is represented for example in FIG. 4, in the case of a planar acoustic transducer surface the outer acoustic transducers are driven with the audio signal earlier than the central region. All elementary waves thus arrive simultaneously at a focal point. After arriving at this focal point, the wavefront also propagates further as a convex wavefront after reflection at the wall display.

With the individually driven acoustic transducers, it is also possible to curve the wavefront differently in the azimuthal plane than in the elevation plane. For instance, the wavefront may have a concave curvature in the azimuthal plane while a convexly curved wavefront is generated in the elevation plane. With the method, it is furthermore possible to adapt the levels and driving times of the individual acoustic transducers, from the elementary waves of which the wavefront is synthesized according to Huygens' principle, in such a way that a very homogeneous distribution of the acoustic pressure level is achieved over the entire audience area.

The localization problem for the center channel in the case of sound-reflecting display screens may be solved according to the present application by generating a focused virtual acoustic source of the wave field synthesis close to the sound-reflecting wall display. The localization of such a virtual acoustic source does not rely on psychoacoustic effects, as the locating of phantom acoustic sources does. It behaves like a real acoustic source at the same position. It is therefore localized independently of the seat position of the viewer.

FIG. 4 shows the schematic representation for a center channel. More specifically, FIG. 4 shows schematically a reproduction room 401 that includes a viewer area 402, a sound-reflecting wall display 403, a two-dimensional WFS acoustic transducer arrangement 404, a starting region 405 of the reflected acoustic waves, a wavefront 406 of the center channel, and left and right loudspeakers 407. The two-dimensional WFS acoustic transducer arrangement 404, which emits at least one acoustic wavefront in the direction of the wall display 403, is suspended below the ceiling, approximately over the front rows of seats. The two-dimensional structure with a multiplicity of individually driven acoustic transducers allows very precise alignment of the wavefront down to the low frequency range. This prevents the viewers in the first rows of seats from receiving direct sound of the acoustic transducer arrangement too early. Otherwise, they would localize the first wavefront above themselves.

The wavefront 406 is curved in such a way that, after its reflection on the wall display 403, it seems to a viewer or listener seated in a seat in the viewer area 402 to emanate from a region 405 that can be associated with an acoustic source optically represented in the corresponding region of the same wall display 403 and can be purposely reflected onto a viewer area 402.

For example, the acoustic transducer arrangement 404 may be spatially aligned in such a way that it is aligned downward at the wall display 403 in the elevation direction by between −2° and −45° in relation to a horizontal plane and it is aligned in the azimuthal direction in such a way that the acoustic waves impinge in the central region of the wall display 403. This provides relative geometrical determination of the acoustic transducer arrangement 404 with respect to the wall display 403 and, through the reflection at the wall display 403, also with respect to the viewer area 402.

With two-dimensional acoustic transducer arrangements 404 driven according to the principle of wave field synthesis (i.e. individually driven acoustic transducers which are arranged substantially in a plane, in a curved surface or in a complexly shaped surface), the emission may be configured in such a way that an aperture angle of the sound beam substantially independent of the reproduction frequency is obtained. Its shape and alignment may also be controlled flexibly. Even the level may be controlled in such a way that the level differences remain very low throughout the reproduction area. Furthermore, undesired reflections at the bounding surfaces of the reproduction room 401 may be substantially avoided. This reduces the outlay for its acoustic configuration.

For the center channel, FIG. 4 shows a wavefront 406 which is focused behind the wall display 403 in the azimuthal plane and the aperture angle of which is adapted in the elevation plane to the requirements of the audience or viewer area 402. The virtual origin of the wavefront then lies close behind the wall display 403, so that it is localized from all viewer seats in the region 405 of the wall display 403.

FIG. 4 also shows that a focal region, which after the reflection of the wavefront 406 at the wall display 403 is perceived as the starting point of the acoustic wavefront from all seats in the viewer area 402, is formed close to the middle of the image. The localization error alpha for an object represented in the middle of the wall display 403 has been reduced for the right seat in the second row of the viewer area 402 from more than 15 degrees to less than three degrees. In the elevation plane, an aperture angle matched to the listener or viewer area 402 is ensured, with which the wavefront can reach all seats in the viewer area 402. In wave field synthesis modules, a direction-dependent level adaptation that ensures a compensated acoustic pressure level throughout the audience or viewer area 402 may additionally be programmed.

For viewers at the front right of the viewer area 402, the acoustic wavefront 406 emanates virtually from the lower middle part of the starting region of the reflected acoustic waves 405. For the viewer at the back left of the viewer area 402, the source position at the upper left in the starting region of the reflected acoustic waves 405 has no perceptible elevation error since the angle remains below the limit of perception because of its distance. The width of the two-dimensional WFS acoustic transducer arrangement 404 is selected in such a way that the reflected wavefront 406 is sufficiently wide even at the front seats of the viewer area 402. Geometrically, the required width may be determined in plan view by drawing connecting lines from the outer seats of the front row of seats to the middle of the wall display and reflecting them there. The width of the acoustic transducer arrangement 404 must then extend beyond these reflected lines in plan view. The left and right loudspeakers 407 are temporally retarded in such a way that the longer acoustic path of the wavefront 406 of the center channel is compensated for.

In principle, it is also possible to depict the left and right channels by means of the reflection at the wall display 403. There is, however, in principle no need for this. Conventional loudspeakers may easily be mounted on the left and right of a wall display 403 that is not acoustically transparent. It is, however, possible to position the starting region of the wavefront somewhat to the left and right of the middle of the image with the two-dimensional WFS acoustic transducer arrangement.

Figure 5:
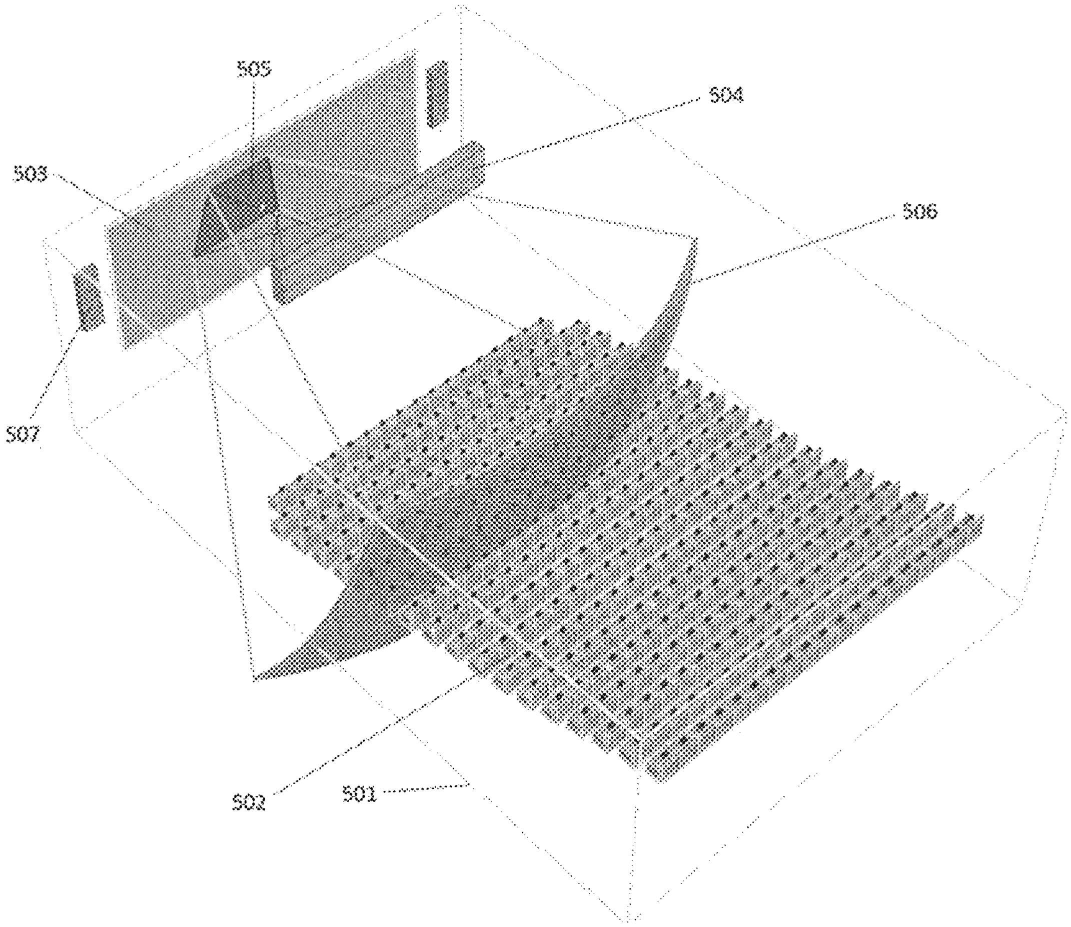

The principle of this is represented in FIG. 5 which shows schematically a reproduction room 501 that includes a viewer area 502, a sound-reflecting wall display 503, a two-dimensional WFS acoustic transducer arrangement 504, a starting region 505 of the reflected acoustic waves, a middle-left wavefront 506, and left and right loudspeakers 507. The two-dimensional WFS acoustic transducer arrangement 504 provided for the center channel is then driven with the respective signal only as far as the middle. The viewers in the viewer area 502 then localize the acoustic event as emanating virtually in the starting region 505 of the reflected acoustic waves somewhat to the left above the middle. The same applies for the right side. If Meta data for the source position which correspond to the audio signal are available, the reproduction may be made even more authentic. Phantom acoustic source formation between the regions left; left middle; center; right middle and right then also allow further improvements in the localization.

Figure 6:
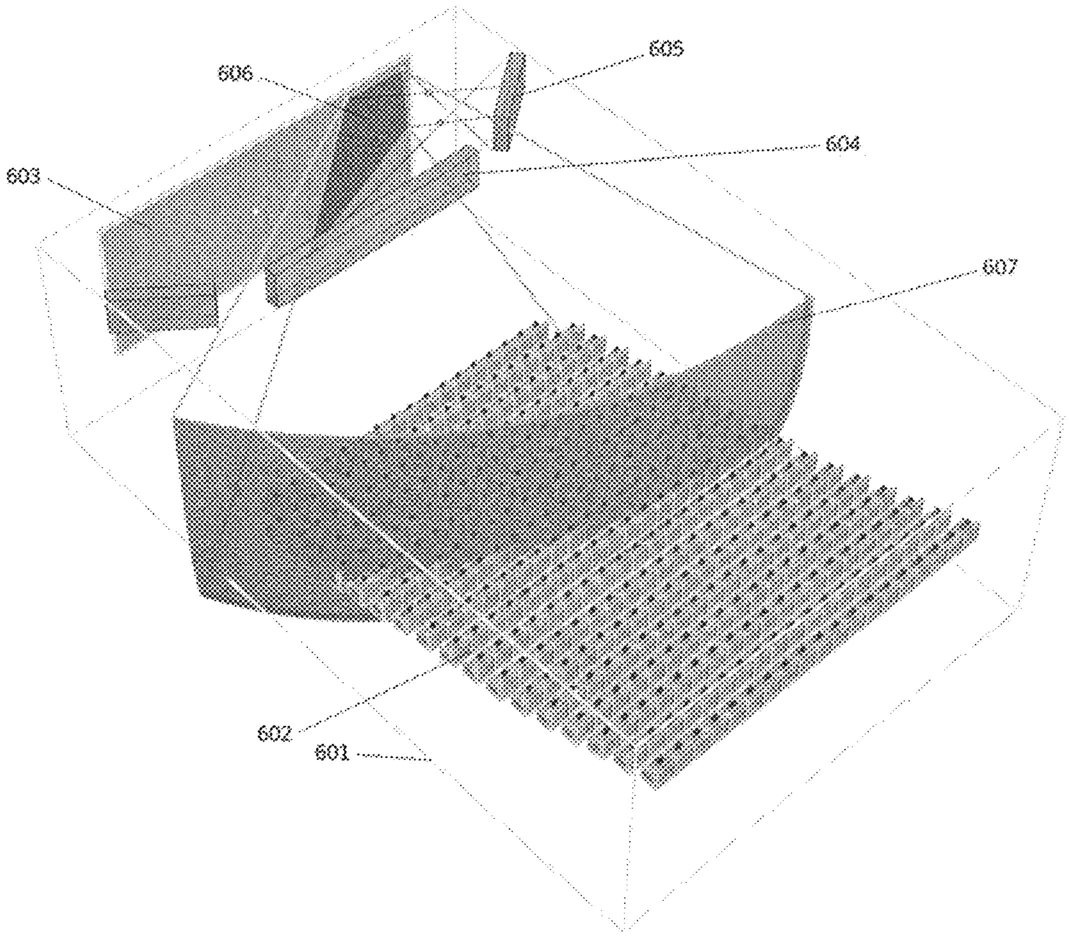

FIG. 6 shows schematically a reproduction room 601 that includes a viewer area 602, a sound-reflecting wall display 603, a two-dimensional WFS acoustic transducer arrangement center 604, a two-dimensional WFS acoustic transducer arrangement right 605, a starting region 606 of the reflected acoustic wavefronts, and a curved wavefront 607 of the virtual right loudspeaker. FIG. 6 shows that the left and right audio channels would also be representable in principle by means of a reflection at the wall display 603 with additional WFS acoustic transducer arrangements 604, 605. This is not possible from the central WFS acoustic transducer arrangement 604.

Because of the given geometry, however, the reflection from the region 606 in the right part of the wall display 603, as well as a corresponding reflection on the left side, has the disadvantage in this case that, for the laterally seated viewers in the front rows, the localization of the source is displaced in the direction of the lower middle region 606 on the wall display 603.

Figure 7:
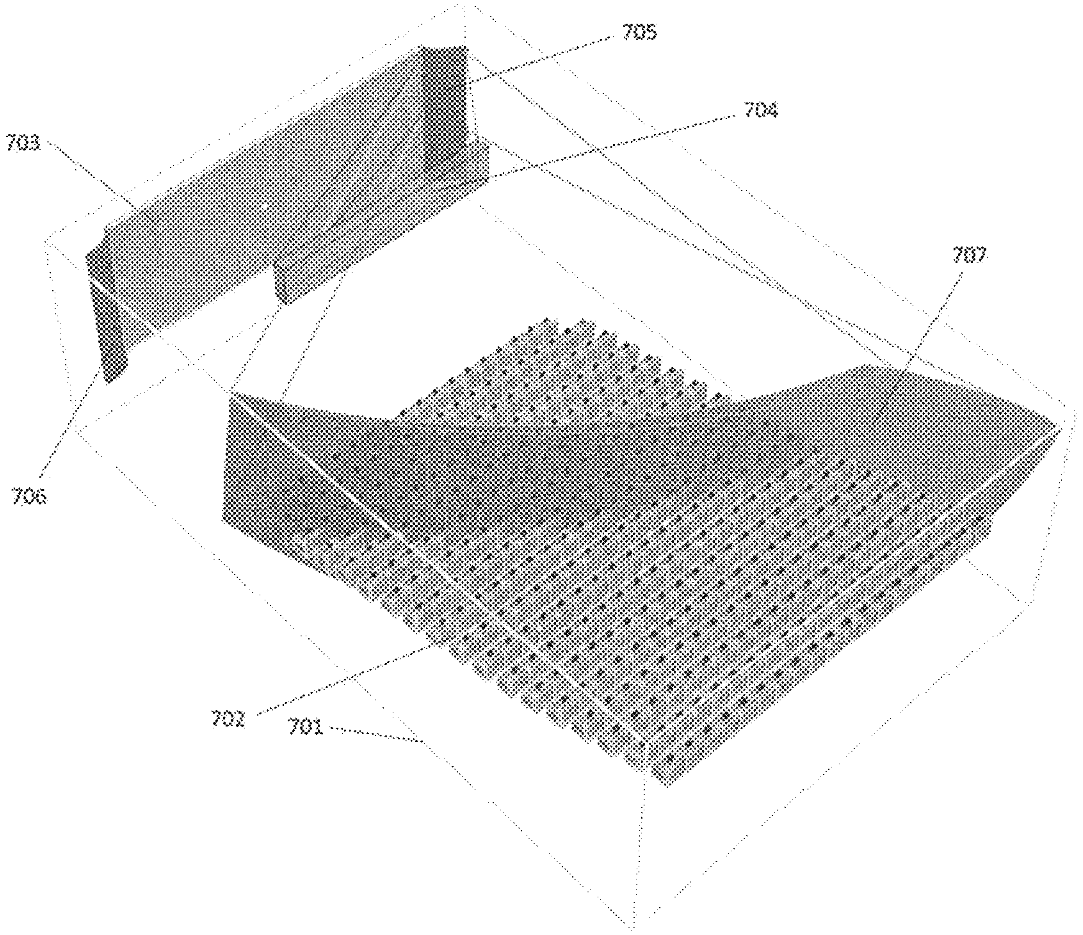

FIG. 7 shows schematically a reproduction room 701 that includes a viewer area 702, a sound-reflecting wall display 703, a two-dimensional WFS acoustic transducer arrangement 704, a right reflector 705, a left reflector 606, and a wavefront 707 of the right reflector 705. FIG. 7 represents another solution for the left and right audio channels. A reflector 705, adapted in its shape to the geometrical conditions in the reproduction room 701, casts a focused beam back as a convex wavefront 707 into the viewer area 702. The two-dimensional WFS acoustic transducer arrangement 704 can then simultaneously generate the audio channels left, left middle, center, right middle and right. A time-aligned subwoofer below the wall display 703 enhances the reproduction.

The outlay for such an installation nevertheless remains high because the two-dimensional WFS acoustic transducer arrangement 704 must be equipped very densely with individually driven acoustic transducers. Their spacing from one another determines the aliasing frequency of the system. Furthermore, accurate control of the sound beam is not possible because side loops propagate in an uncontrolled way. It is, however, also possible to construct at least the center channel with a less elaborate arrangement of acoustic transducers.

Figure 8:
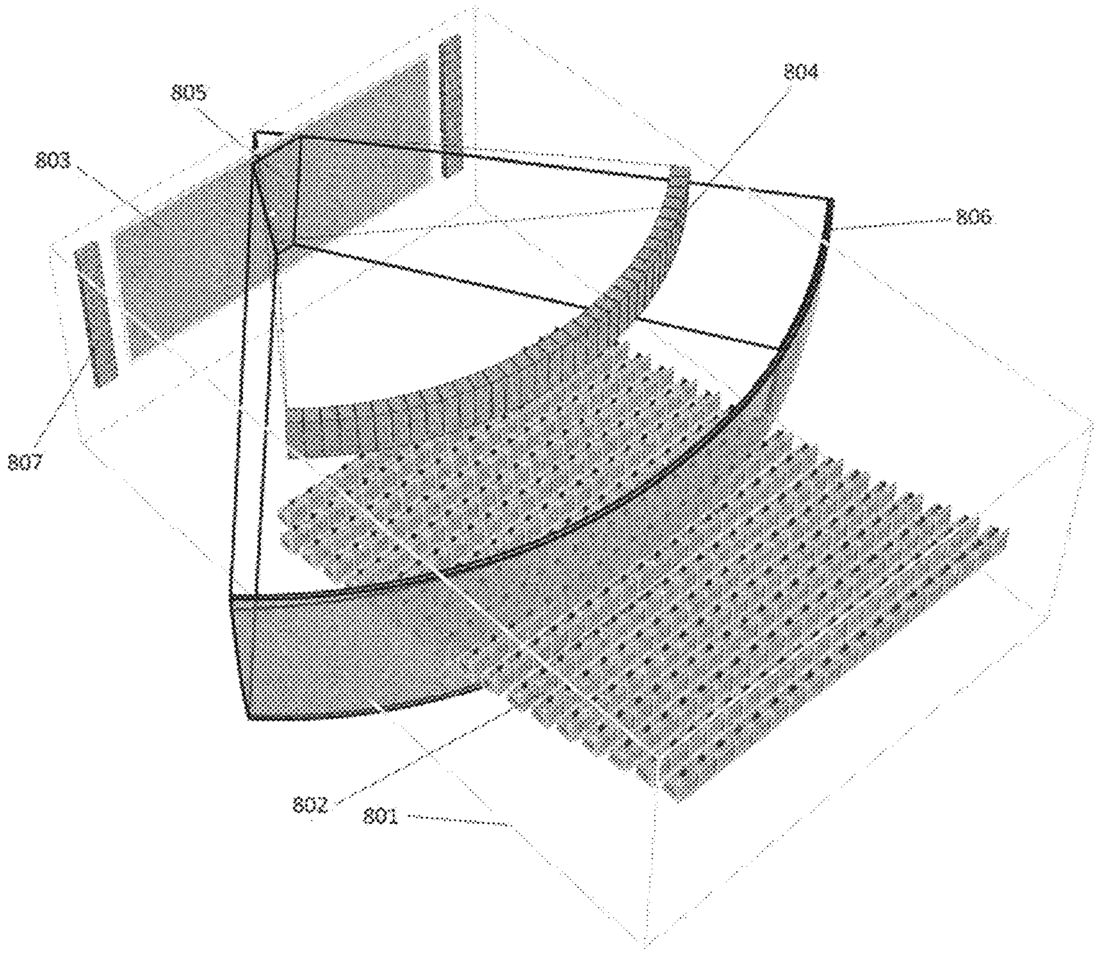

This is illustrated in FIG. 8 which shows schematically a reproduction room 801 that includes a viewer area 802, a sound-reflecting wall display 803, a curved loudspeaker array 804, a starting region 805 of a reflected center wavefront, and the center wavefront 806. In FIG. 8, an array of individual loudspeakers 804 is mounted in a circular cutout under the ceiling in the front viewer area. Each of loudspeaker should have a narrow directional characteristic by means of an acoustic guide, so that the region under the array is not directly irradiated. The midpoint of the circular cutout lies behind the wall display 803. All wavefronts of the individual loudspeakers 804 arrive here at the same time, so that their signals are added in-phase.

Beforehand, however, their wavefronts are reflected at the wall display 803 so that they form a common wavefront that emanates virtually from the starting region 805. All viewers in the viewer area 802 therefore perceive the center wavefront 806 as coming from the middle of the wall display 803. The width of the loudspeaker arrangement 804 determines the horizontal aperture angle, so that the viewer area 802 does not have to be restricted in its width.

However, the wavefront 806 also impinges on the reflection surfaces in the rear region of the reproduction room 801, so that the usual acoustic treatment of the side walls is still necessary. Furthermore, the adaptation of the level values within the center wavefront 806, as is possible with the two-dimensional WFS acoustic transducer arrangement described above, cannot be carried out in this application. Correspondingly, the acoustic pressure level in the back rows will decrease according to the longer distance.

The described possibilities of displacing the reflection region or using lateral reflectors for the left and right channels are also absent from this solution. The advantage is merely that of providing a less elaborate solution for a stably localizable center channel.

In the solution with coherently driven acoustic transducers, the desired vertical emission characteristic must be ensured by design measures. It needs to be configured in such a way that it generates a higher acoustic pressure level in the direction of the viewer seats further away from the wall display than for the nearer seats. The wavefront should thus have more levels in the direction of the upper display screen region than in the direction of the lower part, which supplies the front viewer seats after the reflection of the wavefront at the wall display.

The desired radius of curvature of the loudspeaker arrangement suitable as a virtual center loudspeaker may be adjusted by wedge-shaped or other correspondingly configured mechanical spacers, with which the front acoustic walls of the individual boxes remain mounted close to one another but their rear walls are fixed at a spacing from one another with which the radius of curvature of the overall arrangement adapted to the size of the viewer area is obtained.

Although this disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A wave field synthesis (WFS) sound transducer arrangement for an acoustically opaque screen, the WFS sound transducer arrangement comprising:

a plurality of acoustic transducers arranged and driven to generate at least one acoustic wavefront, wherein the at least one acoustic wavefront is curved such that, upon reflection from the acoustically opaque screen, the least one acoustic wavefront creates a perceptual effect of originating from a defined region on or near a surface of the acoustically opaque screen, the defined region corresponding to a sound source optically represented in the defined region of the acoustically opaque screen, wherein at least one reflected acoustic wavefront is directed and spatially focused to be received within a spectator area, wherein the plurality of acoustic transducers is configured to delay a plurality of elementary waves generated by the plurality of acoustic transducers that combines to form the at least one acoustic wavefront to generate a curvature of the at least one acoustic wavefront according to a principle of WFS, and wherein the plurality of acoustic transducers is further configured to radiate the at least one acoustic wavefront in an azimuthal plane such that the plurality of elementary waves arrives near the acoustically opaque screen at the same time, and wherein the plurality of acoustic transducers is further configured to focus the at least one acoustic wavefront at a location proximate to the acoustically opaque screen, such that the curvature of the at least one acoustic wavefront emanates from the plurality of acoustic transducers concavely in the azimuth plane and convexly or concavely in an elevation plane.

2. The WFS sound transducer arrangement according to claim 1, wherein the plurality of acoustic transducers form a two-dimensional acoustic transducer arrangement, and wherein the curvature of the at least one acoustic wavefront is generated by retarding elementary waves of first acoustic transducers from among the plurality of acoustic transducers relative to second acoustic transducers from among the plurality of acoustic transducers according to the principle of WFS so that the elementary waves combine at a focal region proximate to the acoustically opaque screen.

3. The WFS sound transducer arrangement according to claim 1, wherein emission of the at least one acoustic wavefront is configured in the azimuthal plane such that elementary waves of the at least one acoustic wavefront arrive substantially simultaneously at a focal region proximate to the acoustically opaque screen, and wherein the focal region is located at or behind the acoustically opaque screen.

4. The WFS sound transducer arrangement according to claim 1, wherein the curvature of the at least one acoustic wavefront is concave in the azimuthal plane, and wherein the curvature of the at least one acoustic wavefront is convex or concave in the elevation plane.

5. The WFS sound transducer arrangement according to claim 1, wherein acoustic pressure levels of individual acoustic transducers in a two-dimensional acoustic transducer arrangement are selected according to the principle of WFS such that, after reflection of the at least one acoustic wavefront by the acoustically opaque screen, a higher acoustic pressure level is created in a direction toward viewers located further away from the acoustically opaque screen than toward viewers located closer to the acoustically opaque screen, thereby producing a substantially balanced acoustic pressure level throughout a viewer area.

6. The WFS sound transducer arrangement according to claim 1, wherein the plurality of acoustic transducers is further configured to generate at least one second acoustic wavefront that is reflected by curved acoustic reflectors positioned outside the acoustically opaque screen to form spatially separated reproduction channels.

7. The WFS sound transducer arrangement according to claim 1, wherein the curvature of the at least one acoustic wavefront is formed by coherently driving the plurality of the acoustic transducers such that their emitted acoustic wavefronts arrive substantially simultaneously in the azimuthal plane at a region proximate to the acoustically opaque screen.

8. The WFS sound transducer arrangement according to claim 1, wherein the plurality of the acoustic transducers is arranged in a plurality of discrete housings separated from one another.

9. The WFS sound transducer arrangement according to claim 8, wherein a radius of concave curvature of the at least one acoustic wavefront in the azimuthal plane is determined by mechanical spacers positioned between the plurality of discrete housings.

10. The WFS sound transducer arrangement according to claim 1, wherein emission characteristics of individual acoustic transducers from among the plurality of acoustic transducers are selected such that, after reflection of the at least one acoustic wavefront by the acoustically opaque screen, a higher acoustic pressure level is produced toward viewers located further from the acoustically opaque screen than toward viewers located closer to the acoustically opaque screen, thereby achieving a substantially balanced acoustic pressure level throughout the viewer area.

11. The WFS sound transducer arrangement according to claim 1, wherein the WFS sound transducer arrangement is spatially aligned at the acoustically opaque screen, such that in an elevation direction, the acoustic transducer arrangement is angled downward by between −2° and −45° relative to a horizontal plane, and such that, in an azimuthal direction, acoustic waves emitted by the plurality of acoustic transducers impinge on a central region of the acoustically opaque screen.

12. A method of providing audio from an acoustically opaque screen using wave field synthesis (WFS), the method comprising:

providing a plurality of acoustic transducers arranged as a WFS transducer arrangement relative to the acoustically opaque screen;

driving the plurality of acoustic transducers to generate at least one acoustic wavefront formed from a plurality of elementary waves;

delaying selected ones of the plurality of elementary waves relative to others according to a WFS principle to generate a curvature of the at least one acoustic wavefront;

radiating the at least one acoustic wavefront toward the acoustically opaque screen such that, in an azimuthal plane, the plurality of elementary waves arrives substantially simultaneously at a region proximate to the acoustically opaque screen;

focusing the at least one acoustic wavefront at a location in front of or behind the acoustically opaque screen;

reflecting the at least one acoustic wavefront from the acoustically opaque screen to form at least one reflected acoustic wavefront directed to be received within a spectator area; and configuring the curvature of the at least one acoustic wavefront such that, upon reflection from the acoustically opaque screen, the at least one reflected acoustic wavefront creates a perceptual effect of originating from a defined region on or near a surface of the acoustically opaque screen that corresponds to a sound source optically represented in the defined region of the acoustically opaque screen, wherein the curvature of the at least one acoustic wavefront emanates from the plurality of acoustic transducers concavely in the azimuthal plane and convexly or concavely in an elevation plane.

13. The method of claim 12, wherein the plurality of acoustic transducers is arranged as a two-dimensional acoustic transducer arrangement, and wherein generating the curvature comprises retarding elementary waves from selected acoustic transducers relative to other acoustic transducers according to the WFS principle so that the elementary waves combine at a focal region proximate to the acoustically opaque screen.

14. The method of claim 12, wherein radiating the at least one acoustic wavefront in the azimuthal plane comprises configuring the plurality of acoustic transducers such that the plurality of elementary waves arrive substantially simultaneously at a focal region proximate to the acoustically opaque screen, and wherein the focal region is located at or behind the acoustically opaque screen.

15. The method of claim 12, further comprising selecting acoustic pressure levels for individual ones of the plurality of acoustic transducers according to the WFS principle such that, after reflection from the acoustically opaque screen, a higher acoustic pressure level is produced in a direction toward viewers located further from the acoustically opaque screen than toward viewers located closer to the acoustically opaque screen, thereby producing a substantially balanced acoustic pressure level throughout the spectator area.

16. The method of claim 12, further comprising generating, in addition to a wavefront aligned with a central region of the acoustically opaque screen, additional acoustic wavefronts, and reflecting the additional acoustic wavefronts from curved acoustic reflectors positioned outside the acoustically opaque screen to form spatially separated reproduction channels within the spectator area.

17. The method of claim 12, wherein generating the curvature of the at least one acoustic wavefront comprises coherently driving the plurality of acoustic transducers such that their emitted wavefronts arrive substantially simultaneously in the azimuthal plane at a region proximate to the acoustically opaque screen.

18. The method of claim 12, wherein providing the plurality of acoustic transducers comprises providing acoustic transducers arranged in a plurality of discrete housings separated from one another, the acoustic transducers being arranged to generate the at least one acoustic wavefront that is concavely curved in the azimuthal plane.

19. The method of claim 18, wherein providing the plurality of discrete housings comprises positioning mechanical spacers between the plurality of discrete housings to set a radius of concave curvature of the at least one acoustic wavefront in the azimuthal plane.

20. An acoustic transducer arrangement for use with an acoustically opaque wall display, comprising:

a two-dimensional array comprising a plurality of acoustic transducers; and a controller configured to individually drive the plurality of acoustic transducers to emit a plurality of elementary acoustic waves that combine to form at least one acoustic wavefront directed toward the acoustically opaque wall display, the controller being configured to:

apply respective time delays to the plurality of elementary acoustic waves in accordance with a wave field synthesis (WFS) principle to synthesize the at least one acoustic wavefront with a curvature that is concave in an azimuthal plane and concave or convex in an elevation plane, cause the plurality of elementary acoustic waves to arrive substantially simultaneously at a focal region proximate to the acoustically opaque wall display, such that, upon reflection by the acoustically opaque wall display, at least one reflected acoustic wavefront propagates into a spectator area, and apply respective amplitude/level weights to individual ones of the plurality of acoustic transducers such that, after reflection by the acoustically opaque wall display, an acoustic pressure level in a direction toward spectators farther from the acoustically opaque wall display is greater than an acoustic pressure level in a direction toward spectators closer to the acoustically opaque wall display to provide a substantially balanced acoustic pressure level across the spectator area, wherein the at least one reflected acoustic wavefront creates a perceptual effect of originating from a defined region on or near a surface of the acoustically opaque wall display corresponding to a visually represented sound source in the defined region.

* * * * *